US012726312B2

(12) United States Patent
Yao et al.

(10) Patent No.: US 12,726,312 B2
(45) Date of Patent: Sep. 1, 2026

(54) SYSTEMS AND METHODS FOR UPLINK TRANSMISSION IN MULTI-TRANSMISSION RECEPTION POINTS AND MULTI-PANEL SCENARIOS

(71) Applicant: ZTE CORPORATION, Guangdong (CN)

(72) Inventors: Ke Yao, Shenzhen (CN); Bo Gao, Shenzhen (CN); Chuangxin Jiang, Shenzhen (CN); Zhaohua Lu, Shenzhen (CN); Wenjun Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 300 days.

(21) Appl. No.: 18/532,809

(22) Filed: Dec. 7, 2023

(65) Prior Publication Data

US 2024/0121059 A1 Apr. 11, 2024

Related U.S. Application Data

(63) Continuation of application No. PCT/CN2021/111160, filed on Aug. 6, 2021.

(51) Int. Cl.

| | |
|---|---|
| ***H04L 5/00*** | (2006.01) |
| ***H04B 7/06*** | (2006.01) |
| ***H04W 72/232*** | (2023.01) |
| ***H04W 72/51*** | (2023.01) |

(52) U.S. Cl.

CPC ......... *H04L 5/0051* (2013.01); *H04B 7/0639* (2013.01); *H04W 72/232* (2023.01); *H04W 72/51* (2023.01)

(58) Field of Classification Search

CPC ... H04L 5/0051; H04L 5/0023; H04L 5/0032; H04L 5/0048; H04L 5/0091; H04L 5/1469; H04B 7/0639; H04B 7/0404; H04B 7/022; H04B 7/0628; H04B 7/06956; H04W 72/232; H04W 72/51

See application file for complete search history.

(56) References Cited

U.S. PATENT DOCUMENTS

| | | | | |
|---|---|---|---|---|
| 2019/0372734 | A1 | 12/2019 | Choi et al. | |
| 2020/0382252 | A1 | 12/2020 | Sun | |
| 2020/0389885 | A1 | 12/2020 | Tomeba et al. | |
| 2021/0036815 | A1 * | 2/2021 | Gao | H04B 7/0626 |
| 2024/0276353 | A1 * | 8/2024 | Sun | H04W 48/16 |

FOREIGN PATENT DOCUMENTS

| | | | |
|---|---|---|---|
| CN | 111226414 | A | 6/2020 |
| WO | WO-2020/162718 | A1 | 8/2020 |
| WO | WO-2021/109438 | A1 | 6/2021 |

OTHER PUBLICATIONS

Apple Inc., "On Beam Management Enhancement", 3GPP TSG-RAN WG1 Meeting #105-e, R1-2105087, May 27, 2021, e-Meeting (23 pages).

(Continued)

*Primary Examiner* — Kyaw Z Soe

(74) *Attorney, Agent, or Firm* — Foley & Lardner LLP

(57) ABSTRACT

A wireless communication method includes determining at least one Sounding Reference Signal (SRS) resource set configured by a BS, each SRS resource set comprises at least one SRS resource; and transmitting, to the BS, an uplink transmission based on the at least one SRS resource set.

20 Claims, 3 Drawing Sheets

(56) References Cited

OTHER PUBLICATIONS

International Search Report and Written Opinion for PCT Appl. No. PCT/CN2021/111160, mailed Apr. 29, 2022 (8 pages).
Lenovo, et al., "Enhancements on Multi-beam Operation", 3GPP TSG RAN WG1 #105-e, R1-2104404, May 27, 2021, e-Meeting (14 pages).
LG Electronics, "Enhancements on SRS flexibility, coverage and capacity", 3GPP TSG RAN WG1 #104b-e, R1-2103509, Apr. 20, 2021, e-Meeting (8 pages).
Mediatek Inc., "Enhancement on multi-beam operation", 3GPP TSG RAN WG1 #105-e, R1-2105353, May 27, 2021, e-Meeting (28 pages).
Moderator (Samsung), "Moderator summary for multi-beam enhancement", 3GPP TSG RAN WG1 #104-e, R1-2101185, Feb. 5, 2021, e-Meeting (37 pages).
Moderator (Samsung), "Moderator summary#2 for multi-beam enhancement: Round 1", 3GPP TSG RAN WG1 #104-e, R1-2101856, Feb. 5, 2021, e-Meeting (30 pages).
Moderator (ZTE), "Fl summary #2 on SRS enhancements", 3GPP TSG RAN WG1 Meeting #104b-e, Apr. 20, 2021, e-Meeting (40 pages).
Moderator (ZTE), "FL summary #3 on SRS enhancements", 3GPP TSG RAN WG1 Meeting #104b-e, R1-2103928, Apr. 20, 2021, e-Meeting (14 pages).
Nokia, et al., "Enhancements on Multi-beam Operation", 3GPP TSG RAN WG1 #105-e, R1-2105273, May 27, 2021 e-Meeting (48 pages).
Oppo, "Enhancements on Multi-Beam Operation", 3GPP TSG RAN WG1 #105-e, R1-2104732, May 27, 2021, e-Meeting (18 pages).
Extended European Search Report for EP Appl. No. 21952395.8, dated Jul. 10, 2024 (8 pages).

* cited by examiner

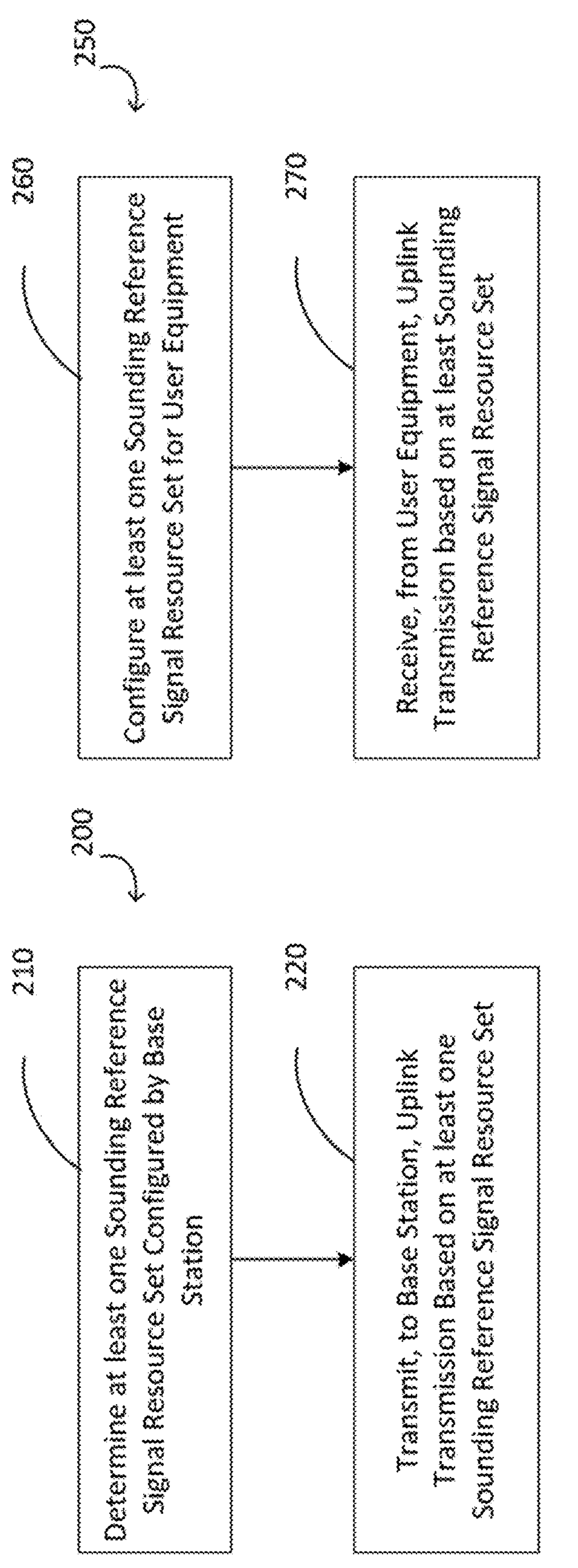
250
260
Configure at least one Sounding Reference Signal Resource Set for User Equipment
270
Receive, from User Equipment, Uplink Transmission based on at least Sounding Reference Signal Resource Set
FIG. 2B
200
210
Determine at least one Sounding Reference Signal Resource Set Configured by Base Station
220
Transmit, to Base Station, Uplink Transmission Based on at least one Sounding Reference Signal Resource Set
FIG. 2A

SYSTEMS AND METHODS FOR UPLINK TRANSMISSION IN MULTI-TRANSMISSION RECEPTION POINTS AND MULTI-PANEL SCENARIOS

CROSS-REFERENCE TO RELATED APPLICATION

This application claims the benefit of priority under 35 U.S.C. § 120 as a continuation of PCT Patent Application No. PCT/CN2021/111160, filed on Aug. 6, 2021, the disclosure of which is incorporated herein by reference in its entirety.

TECHNICAL FIELD

The disclosure relates generally to wireless communications and, more particularly, to systems and methods for uplink transmission in multi-transmission reception point and multi-panel scenarios.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some arrangements, User Equipment (UE) performs a method including determining at least one Sounding Reference Signal (SRS) resource set configured by a BS, each SRS resource set comprises at least one SRS resource; and transmitting, to the BS, an uplink transmission based on the at least one SRS resource set.

In other arrangements, Base Station (BS) performs a method including configuring, by a network, at least one Sounding Reference Signal (SRS) resource set for a UE, each SRS resource set comprises at least one SRS resource; and receiving, by the network from the wireless communication device, an uplink transmission based on the at least one SRS resource set.

In other embodiments, a wireless communications apparatus comprising a processor and a memory, wherein the processor is configured to read code from the memory and implement a method including determining at least one Sounding Reference Signal (SRS) resource set configured by a BS, each SRS resource set comprises at least one SRS resource; and transmitting, to the BS, an uplink transmission based on the at least one SRS resource set.

In other embodiments, a computer program product comprising a computer-readable program medium code stored thereupon, the code, when executed by a processor, causing the processor to implement a method including determining at least one Sounding Reference Signal (SRS) resource set configured by a BS, each SRS resource set comprises at least one SRS resource; and transmitting, to the BS, an uplink transmission based on the at least one SRS resource set.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 2A is a flowchart diagram illustrating an example wireless communication method for performing uplink transmissions according to an SRS resource set, according to various embodiments.

FIG. 2B is a flowchart diagram illustrating another example wireless communication method for performing uplink transmissions according to an SRS resource set, according to various embodiments.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

One of the key features of the New Radio (NR) technology of Fifth Generation (5G) mobile communication systems is the support of high frequency bands. High frequency bands have abundant frequency domain resources, but wireless signals in high frequency bands decay quickly, and coverage of the wireless signals becomes small. Thus, transmission of signals in beam mode is able to concentrate energy in a relatively small spatial range and to improve the coverage of the wireless signals in the high frequency bands. Furthermore, NR Node B (gNB) configured with multiple Transmission Reception Points (TRPs) and/or User Equipment (UE) configured with multiple panels usually provide a plurality of candidate beam pairs, which can improve throughput and robustness.

Figure 1:
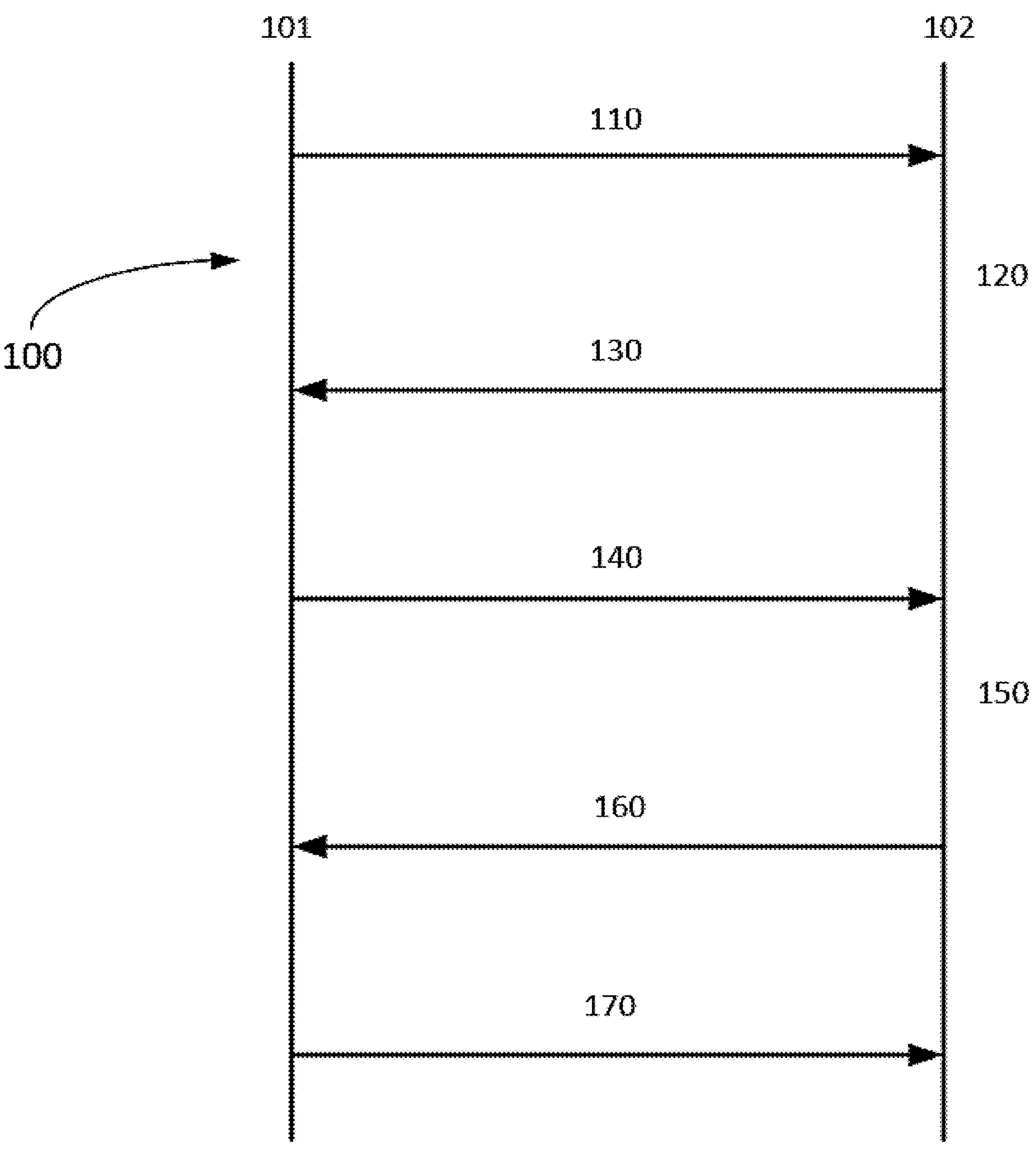
FIG. 1 is an example flowchart for a procedure of setting up a Sounding Reference Signal (SRS) resource set and applying SRS to codebook-based PUSCH transmission, according to various embodiments.

Physical Uplink Shared Channel (PUSCH) transmission is scheduled based on Sounding Reference Signal (SRS) transmission. SRS resource(s) are configured in a SRS resource set with a usage of beam management, antenna switching, Codebook (CB), or Non-Codebook (NCB) to UE by network (or gNB) via Radio Resource Control (RRC) signaling for codebook-based PUSCH transmission or non-codebook-based PUSCH transmission, respectively. FIG. 1 is an example flowchart for a procedure 100 of setting up an SRS resource set and applying SRS to codebook-based PUSCH transmission. As shown in FIG. 1, the flowchart is performed by a UE 101 and a gNB 102. The procedure 100 begins at 110, where the UE reports that a maximum number of SRS ports per resource is 2. At 120, the gNB configures a SRS resource set with 2 ports, and triggers the SRS resource set (e.g., aperiodic) at 130. At 140, the UE uses a first panel (i.e., Panel-1) to transmit SRS in the SRS resource set. At 150, the gNB performs an Uplink (UL) Channel State Information (CSI) measurement, and uses a SRI field to indicate a SRS in the SRS resource set to schedule a PUSCH transmission at 160. Finally, at 170, the UE performs a PUSCH transmission based on the indicated SRS. This procedure applies in the case of a single-panel (e.g., Panel-1) UE and multi-panel UE in which all panels share the same capability. However, it would be beneficial to support multi-panel UE with different capabilities for the panels. The current technology cannot support such a multi-panel UE in part because it cannot report different capabilities supported by multiple panels, cannot determine power scaling factors for PUSCH transmission, and cannot determine SRS resources for PUSCH transmission in the case of multiple panels with different capabilities in UE.

In a first embodiment, a method for reporting different capabilities supported by different panels is described. In a first solution for the first embodiment, the UE reports at least one capability set to a network (or BS, gNB). The at least one capability set may include a first or a second capability set. The first capability set may include a set of values for a feature set or an index that indicates a set of values for the feature set, and the second capability set may include a set of values for a feature or an index to indicate a set of values for the feature. The feature (or a feature that is a part of the set of features) may include a (maximum) number of ports (or antenna ports), (maximum) number of layers, (maximum) number of beam resources, a number of beam resources at a time, or (minimum) activation/selection delay. In some embodiments, each value in the capability set corresponds to one feature (i.e., a set of values for a set of features), while in other embodiments, more than one value may correspond to one feature (i.e., a set of values for a feature), and may also correspond to panel-related information. If the capability set includes an index, the index may indicate a set of values that are selected or indicated from a predefined set of values for the particular feature or the feature set. Furthermore, the first capability set may correspond to panel-related information, and at least one value in the set of values indicated by the second capability set may also correspond to the panel-related information. The panel-related information here includes at least one of: a) a panel; b) a panel group comprising a plurality of panels; c) an antenna array or sub-array (i.e., each panel may include one or more antenna arrays, subarrays); d) an antenna group; e) an SRS resource set or subset (e.g., with usage of beam management, codebook, non-codebook, or antenna switching); f) a RS resource set or subset (e.g., may include a CSI-RS resource set or subset); g) a capability set; or h) an index of a value in a set of values for a feature in a capability set. The UE may report the number of panels in each panel group.

Each feature may correspond to a panel object, but the value of a feature for a panel object may be reflected as a value of a related parameter for a SRS resource set corresponding to the panel object. For example, the number of ports of a feature for a panel (or panel object) corresponds to a number of ports of a SRS resource in a SRS resource set. In another example, there may be 2 different values (e.g., 2 and 4) for a number of ports of 2 SRS resource sets with codebook usage. If the SRS resource set usage is for beam management, the number of beam resources of a feature for a panel corresponds to the number of SRS resources in the SRS resource set. The number of beam resources at a time corresponds to a number of SRS resources scheduled at a time or to a number of SRS resources scheduled for a PUSCH transmission (or simultaneously transmitted PUSCH transmissions) at a time, related to a panel object. Activation (or selection) delay corresponds to a time period may be related to a SRS resource set.

The maximum number of beam resources can be used to determine the maximum number in one SRS resource set for beam management. A maximum number of beam resources at a time can be used to determine the maximum number of beam resources at a time (or simultaneously transmitted) for a panel object in one SRS resource set for non-codebook based transmission or codebook based transmission. In the case of SRS resource set for non-codebook based transmission (i.e. with usage of non-codebook), the maximum number of beam resources at a time can be the maximum number of SRS ports for a panel object at a time. In the case of SRS resource set for codebook based transmission (i.e. with usage of codebook), the maximum number of beam resources at a time can be the maximum number of SRS resources for a panel object at a time. The feature or the feature set reflects the capability for a panel object. The panel object may comprise a panel, a panel group, an antenna array or sub-array, or an antenna group.

For example, a UE may report 2 first capability sets to a network (or gNB). In the first capability set #1, the maximum number of ports (or antenna ports) is 2, the maximum number of layers is 2, the maximum number of beam resources is 4, and the minimum activation/selection delay is t1. In first capability set #2, the maximum number of ports (or antenna ports) is 4, the maximum number of layers is 4, the maximum number of beam resources is 8, and the minimum activation/selection delay is t2. In this example, the first capability sets #1 and #2 are supposed to correspond to a first panel and a second panel respectively. With the capability set information, the gNB may configure for the UE at least one SRS resource set for beam management. For example, some SRS resource sets may include, at most, 4 beam resources as indicated in first capability set #1, and other SRS resource sets may include, at most, 8 beam resources as indicated in first capability set #2. SRS resource (s) are configured in a SRS resource set with a usage of beam management, antenna switching, Codebook (CB), or Non-Codebook (NCB) to UE by network (or gNB) via Radio Resource Control (RRC) signaling. SRS resource (set) with usage of codebook or non-codebook is used for codebook-based PUSCH transmission or non-codebook-based PUSCH transmission, respectively. Among SRS resource sets with the same usage, the values of features for each SRS resource set could have the same or different values of features. Put differently, there are different values for at least one feature among the SRS resource sets with the same usage. The UE then transmits a UL transmission based on the configured SRS resource set.

The first capability sets #1 and #2 may also correspond to a first group of panels and a second group of panels (as opposed to a single panel). Each panel group includes at least one panel, and the number of panels in the group of panels is also reported. For example, the first capability set #1 is for 2 panels, and the first capability set #2 is for 1 panel. These numbers (i.e., 2 panels and 1 panel) are reported for the first capability sets #1 and #2 respectively. The maximum number of layers may be configured for each SRS resource set, and a number of layers for a SRS resource set should not be larger than the value of a maximum number of layers for the corresponding panel or panel group. The value of a minimum activation/selection delay is used when a corresponding panel is selected or activated.

Beam state for an UL transmission can be based on a SRS resource set for beam management. Alternatively, beam state for an UL transmission can be based on Downlink (DL) Reference Signal (RS) (e.g., CSI-RS, Synchronization Signal Block (SSB)) for beam management that uses reciprocity. The gNB may configure one or more SRS resource sets for UL transmission (e.g., PUSCH). The SRS resource set includes at least one SRS resource, and a number of ports is configured for each SRS resource. A SRS resource set may also correspond to a panel or panel group, and a number of ports for a SRS resource in the SRS resource set should not be larger than the value of a maximum number of ports for the corresponding panel or panel group. As such, the UE may receive an indication, from the network, of one or more relationships between SRS resource set and panel-related information based on an explicit indication (e.g., associating a panel ID with each SRS resource set). The SRS resource set may also be associated with a panel by the UE, even without a panel ID indicated by the gNB.

Alternatively, a SRS resource may correspond to a panel, and a number of ports for the SRS resource should not be larger than the value of a maximum number of ports for the corresponding panel. In this situation, a SRS resource set corresponds to at least one panel or panel group, depending on the SRS resources included in the SRS resource set. The UE may determine the relationship between SRS resource and panel-related information based on an explicit indication from the network (e.g., associating a panel ID with each SRS resource), or the UE may determine the relationship between a SRS resource and panel-related information based on the spatial relation of the SRS resource. The panel-related information here includes at least one of: a) a panel; b) a panel group; c) an antenna array or sub-array (i.e., each panel may include one or more antenna arrays, subarrays, or groups); d) an antenna group; e) an SRS resource set or subset (e.g., with usage of beam management, codebook, non-codebook, or antenna switching); f) a RS resource set or subset (e.g., may include a CSI-RS resource set or subset); g) a capability set; or h) an index of a value in a set of values for a feature in a capability set. In some embodiments, the SRS resource for spatial relation is a SRS resource for beam management, and, in these embodiments, the relationship between SRS resource and panel can be deduced by the relationship between the corresponding SRS resource set and panel. In other embodiments, the SRS resource for spatial relationship is a DL RS, and, in these embodiments, the relationship between SRS resource and panel can be deduced by a report related to the DL RS. This report is associated with a panel ID or a group ID.

In a second solution for the first embodiment, the UE reports a feature mode (i.e. second capability set) to a network. The feature mode indicates a set of values for at least one feature. The feature mode can be indicated by a number of values for a feature each of which corresponds to a panel object. For example, a set of values {2,4} indicate a maximum number of ports can be 2, and 4 for two panel objects. Furthermore, the feature mode is selected from a set of predefined candidate feature modes. For example, a predefined candidate feature mode for a maximum number of ports can be an integer (e.g., 1, 2, 4, 8, etc.). For a mode with 2 values, the following Table 1 is used:

TABLE 1

| | |
|---|---|
| Mode #1 | {2,2} |
| Mode #2 | {2,4} |
| Mode #3 | {4,4} |
| Mode #4 | {2,8} |
| Mode #5 | {4,8} |
| Mode #6 | {8,8} |

For a mode with 3 values, the following Table 2 is used:

TABLE 2

| | |
|---|---|
| Mode #1 | {2,2,2} |
| Mode #2 | {2,2,4} |
| Mode #3 | {2,4,4} |
| Mode #4 | {4,4,4} |
| Mode #5 | {2,2,8} |
| Mode #6 | {4,4,8} |
| Mode #7 | {4,8,8} |

In a second embodiment, a method for determining a power or power scaling for normal power control and full Transmitting (Tx) power is described. As background, for a codebook-based PUSCH transmission with one or more antenna ports, a power scaling factor (e.g., s) is used to determine transmit power on each antenna port. The power scaling factor is determined according to a maximum number of SRS ports supported by the UE in a single SRS resource. When the power scaling factor is used to scale a transmit power of a UL transmission for all antenna ports, the scaled transmit power is split (e.g., equally) across the antenna ports on which the UE transmits the PUSCH with non-zero power. However, for a UE with multiple panels having different capabilities, a maximum number of SRS ports supported by the UE in one SRS resource may be suitable for some panel(s) with the largest number of maximum number of SRS ports among all supported panels, but may be too strict for other panel(s), such as those with a smaller number of maximum number of SRS ports. This may lead to a lower transmit power by using a maximum number of SRS ports supported by the UE in one SRS resource to determine the power scaling factor.

The power or power scaling factor is determined according to: a) a maximum number of SRS ports supported by one SRS resource in a SRS resource set associated with the UL transmission (e.g., PUSCH); b) a maximum number of SRS ports supported by one SRS resource in a SRS resource set associated with the UL transmission (e.g., PUSCH) or c) a maximum number of SRS ports related to a SRS resource set associated with the UL transmission (e.g., PUSCH). The SRS resource set associated with the UL transmission (e.g., PUSCH) refers to at least one of a) a SRS resource set with usage of CB or NCB corresponding to a CB-based or NCB-based PUSCH transmission; b) a SRS resource set indicated for the PUSCH transmission by, for example, a field related to SRS resource set in a DCI scheduling the PUSCH transmission (e.g., when a DCI schedules PUSCH transmission(s) in a multi-TRP case, then a 2-bit field (as shown below in Table 3) can be used to indicate the SRS resource set). The SRS resource set associated with the UL transmission is indicated (or selected) from a RRC-configured SRS resource set pool that includes at least one SRS resource set with a certain usage (e.g., CB or NCB corresponding to a CB-based or NCB-based PUSCH transmission).

As referenced in Table 3, a codepoint value corresponds with a SRS resource set(s) and a SRS Resource Indicator (SRI), for CB or NCB transmission, or Transmit Precoding Matrix Indicator (TPMI), for CB transmission only. For example, a value of “00” and “01” indicate the first and second SRS resource sets for a PUSCH transmission, respectively. A value of “10” indicates the first SRS resource set for a first PUSCH transmission, and the second SRS resource set for a second PUSCH transmission. A value of “11” indicates the second SRS resource set for a first PUSCH transmission, and the first SRS resource set for a second PUSCH transmission.

TABLE 3

| Codepoint | SRS resource set(s) | SRI (for both CB and NCB)/TPMI (CB only) field(s) |
|---|---|---|
| 00 | s-TRP mode with 1$^{st}$ SRS resource set (TRP1) | 1$^{st}$ SRI/TPMI field (2$^{nd}$ field is unused) |
| 01 | s-TRP mode with 2$^{nd}$ SRS resource set (TRP2) | 1$^{st}$ SRI/TPMI field (2$^{nd}$ field is unused) |
| 10 | m-TRP mode with (TRP1, TRP2 order)<br>1$^{st}$ SRI/TPMI field: 1$^{st}$ SRS resource set<br>2$^{nd}$ SRI/TPMI field: 2$^{nd}$ SRS resource set | Both 1$^{st}$ and 2$^{nd}$ SRI/TPMI fields |
| 11 | m-TRP mode with (TRP2, TRP1 order)<br>1$^{st}$ SRI/TPMI field: FFS<br>2$^{nd}$ SRI/TPMI field: FFS | Both 1$^{st}$ and 2$^{nd}$ SRI/TPMI fields |

In another example, the first SRS resource set has 4 as the maximum number of ports, and the second SRS resource set has 2 as the maximum number of ports. If a value of “00” of the field related to SRS resource set is indicated in a DCI, the maximum number of ports being 4 is used to determine the power scaling factor for the PUSCH transmission scheduled by the DCI. If a value of “10” of the field related to the SRS resource set is indicated in a DCI, the maximum number of ports being 4 is used to determine the power scaling factor for the first PUSCH transmission scheduled by the DCI, and the maximum number of ports being 2 is used to determine the power scaling factor for the second PUSCH transmission scheduled by the DCI.

For simultaneous PUSCH transmissions with multiple panels, power scaling factor may then be determined per panel. Put differently, for simultaneous PUSCH transmissions, power scaling factor may be determined for each PUSCH transmission according to a maximum number of SRS ports related to a SRS resource set associated with the corresponding PUSCH transmission.

In a third embodiment, a method for determining the size of a SRI/TPMI field in DCI signaling from the network is described. As background, in the case of a single SRS resource set being associated with a PUSCH transmission, the bitwidth/bit size of a SRI field in a DCI is determined according to a transmission configuration (e.g., txConfig=nonCodebook, or txConfig=codebook), or a number of configured SRS resources in the SRS resource set with usage value corresponding to ‘codeBook’ or ‘nonCodeBook’, e.g. $N_{SRS}$. When txConfig=codebook, the SRS resource set with usage value corresponding to ‘codeBook’ is used, and when txConfig=nonCodebook, the SRS resource set with usage value corresponding to ‘nonCodeBook’ is used.

The bitwidth/bit size of aSRI field in a DCI is determined as $$\left\lceil \log_2\left(\sum_{k=1}^{\min\{L_{max},N_{SRS}\}} \binom{N_{SRS}}{k}\right)\right\rceil$$

or $\lceil \log_2(N_{SRS}) \rceil$, where $N_{SRS}$ is the number of configured SRS resources in the SRS resource set configured by higher layer parameter srs-ResourceSetToAddModList, and associated with the higher layer parameter usage of value ‘codeBook’ or ‘nonCodeBook’, which is determined based on the higher layer parameter txConfig=nonCodebook, or ‘codeBook’ respectively. $L_{max}$ is determined by a parameter from the network or given by the maximum number of layers for PUSCH supported by the UE for the serving cell for non-codebook based operation.

Bitwidth/bit size of Precoding information and a number of layers field in a DCI is determined according to a transmission configuration (e.g. txConfig=nonCodebook, or txConfig=codebook), full power mode (e.g. ul-FullPowerTransmission=fullpowerMode1, fullpowerMode2 or fullpower), transform precoder (e.g. enable or disable), or a maximum rank (e.g. maxRank), coherent capability (codebookSubset=nonCoherent, partialAndNonCoherent, or fullyAndPartialAndNonCoherent). Precoding information and number of layers in a DCI can also be referred to or noted as a TPMI field.

Referring back to Table 3, if a multi-TRP is configured by a network, the single-TRP or multi-TRP is dynamically indicated according to a field related to SRS resource set. If a single-TRP or single SRS resource set is indicated in a DCI, only one SR (for either CB or NCB) and one TPMI field (for CB only) is needed. However, the bit size of DCI should not be dynamically variable, especially because the bit size of a single field in DCI should not be determined according to a value of another field in the same DCI. As such, bit size of the SRI field (for both CB and NCB) or the TPMI field (CB only) should be designed for multi-TRP.

As a solution, a value N for the number of parts for the SRI or TPMI field is determined as an integer. N may be: a) a pre-defined or a configured integer (e.g., 1, 2, 4, etc.); b) a maximum number of TRPs served for a UE at one time (e.g., if at most 2 TRPs serve a UE, N is equal to 2); c) a number of active panels (or panel objects) in a UE at one time; d) a number of SRS resource sets with usage of CB or NCB (which depends on a CB-based or NCB-based transmission respectively); or e) a number of SRS resource sets related to active panels. The size of each part of SRI or TPMI field may be determined according to one of the following schemes. The UE determines panel active state based on at least one of: a) UE report for panel active state; b) indication for panel active state from gNB; or c) response for UE report for panel active state. Panel or panel object may correspond to SRS resource set. For example, one panel object corresponds to a SRS resource set.

In a first scheme, all parts of the SRI or TPMI field have a same number of bits, and the number of bits is determined as at least one of: a) the largest value of a maximum number of ports among all reported values of a maximum number of ports for each part of SRI or TPMI related to TRP, panel, or SRS resource set; b) the largest value of a maximum number of ports among the reported values of a maximum number of ports related to active panel(s) for each part of SRI or TPMI related to TRP, panel, or SRS resource set; c) the largest value among the number of ports of SRS resources in SRS resource sets with usage of codebook or non-codebook; or d) the largest value among the number of ports of SRS resources in SRS resource sets related to active panel(s).

In another scheme, the size of the SRI or TPMI field may be determined based on a size of each part of the SRI or TPMI field as at least one of: a) reported values of a number of ports; b) reported values of a number of ports related to the active panel (or panel object); c) a number of ports of SRS resources in SRS resource sets; or d) a number of ports of SRS resources in SRS resource sets related to active panel.

In a second scheme, N part of the SRI or TPMI field may have a different number of bits, which is determined as at least one of: a) the largest value of a maximum number of ports among all reported values of a maximum number of ports for each part of SRI or TPMI related to TRP, panel, or SRS resource set; b) the largest value of a maximum number of ports among the reported values of a maximum number of ports related to active panel(s) for each part of SRI or TPMI related to TRP, panel, or SRS resource set; c) the largest value among the number of ports of SRS resources in SRS resource sets with usage of codebook or non-codebook; or d) the largest value among the number of ports of SRS resources in SRS resource sets related to active panel(s).

FIG. 2A is a flowchart diagram illustrating an example wireless communication method 200, according to various arrangements. Method 200 can be performed by a User Equipment (UE), and begins at 210 where the UE determines at least one Sounding Reference Signal (SRS) resource set configured by a network. Each SRS resource set includes at least one SRS resource. At 220, the UE transmits, to the network, an Uplink (UL) transmission based on the at least one SRS resource set.

In some embodiments, the method 200 further includes reporting, to the network, at least one first capability set or at least one second capability set. The first capability set includes a set of values for a set of features, or a first index to indicate the set of values for the set of features. The second capability set includes a set of values for a feature, or a second index to indicate the set of values for the feature. In some of these embodiments, the first index indicates the set of values for the set of features from at least one predefined set of values for the set of features, and the second index indicates the set of values for the feature from at least one predefined set of values for the feature. In other of these embodiments, the first capability set corresponds to a panel-related information, and at least one of values in the set of values for a feature in the second capability set corresponds to a panel-related information.

In some embodiments, the feature comprises one of a) a number of ports, b) a number of antenna ports, c) a number of layers, d) a number of beam resources, e) a number of beam resources at a time, f) a activation delay, or g) a selection delay. The set of features comprises at least one of a) a number of ports, b) a number of antenna ports, c) a number of layers, d) a number of beam resources, e) a number of beam resources at a time, f) a activation delay, or g) a selection delay.

In some embodiments, the method 200 further includes receiving, from the network, an indication indicating a) a first relationship between the SRS resource set and panel-related information; or b) a second relationship between a SRS resource and panel-related information. In other embodiments, the method 200 further includes determining a) a first relationship between the SRS resource set and panel-related information based on an RS associated with the SRS resource set; or b) a second relationship between the SRS resource and panel-related information based on a spatial relation of the SRS resource. In any of the above embodiments, the panel-related information comprises at least one of: a) a panel; b) a panel group; c) an antenna array or sub-array; d) an antenna group; e) a SRS resource set or subset; f) a RS resource set or subset; g) a first capability set; or h) an index of a value in a set of values for a feature in a second capability set. In some of these embodiments, the method 200 further includes reporting, to the network, a number of the plurality of panels for each panel group.

In some embodiments, the method 200 further includes determining a power for the UL transmission according to at least one of: a) a maximum number of Sounding Reference Signal (SRS) ports related to a SRS resource set associated with the UL transmission; b) a maximum number of Sounding Reference Signal (SRS) ports supported by one SRS resource in a SRS resource set associated with the UL transmission; or c) a maximum number of SRS ports related to the SRS resource set associated with the UL transmission. In other embodiments, the method 200 further includes determining a power scaling factor for the UL transmission according to at least one of: a) a maximum number of Sounding Reference Signal (SRS) ports related to a SRS resource set associated with the UL transmission; b) a maximum number of Sounding Reference Signal (SRS) ports supported by one SRS resource in a SRS resource set associated with the UL transmission; or c) a maximum number of SRS ports related to the SRS resource set associated with the UL transmission.

In some embodiments, the method 200 further includes determining a size of Sounding Reference Signal (SRS) Resource Indicator (SRI) field or Transmit Precoding Matrix Index (TPMI) field of Downlink Control Information (DCI) signaling received by the UE from the network. In some of these embodiments, determining the size of the SRI or TPMI field includes determining an integer N for a number of parts in the SRI field or TPMI field. In some of these embodiments, N is determining according to at least one of: a) a predefined integer or a configured integer; b) a maximum number of Transmission and Reception Points (TRPs) serving the wireless communication device; c) a number of active panels in the wireless communication device; d) a number of SRS resource sets with usage of codebook, or non-codebook; or e) a number of SRS resource sets related to active panels. In other of these embodiments, determining the size of the SRI or TPMI field includes determining the size for each part of the field according to at least one of: a) reported values of number of ports; b) reported values of number of ports related to active panel; c) number of ports of SRS resources in SRS resource sets; or d) number of ports of SRS resources in SRS resource sets related to active panel.

In some of these embodiments, determining the size of the SRI field or TPMI field includes determining that all parts of each field have the same number of bits. In other of these embodiments, determining the size of the SRI field or TPMI field includes determining a number of bits for each part of the fields according to at least one of: a) a largest value among all reported values of a maximum number of ports; b) a largest value among the reported values of a maximum number of ports related to active panels; c) a largest value among the number of ports of SRS resources in SRS resource sets with usage of codebook or non-codebook; or d) a largest value among the number of ports of SRS resources in SRS resource sets related to active panel. In further of these embodiments, determining the size of the SRI or TPMI field includes determining the number of bits for the N parts of each field according to at least one of: a) a largest N values among all reported values of maximum number of ports; b) a largest N values among the reported values of maximum number of ports related to active panels; c) a largest N values among the number of ports of SRS resources in SRS resource sets with usage of codebook or non-codebook; or d) a largest N values among the number of ports of SRS resources in SRS resource sets related to active panel.

FIG. 2B is a flowchart diagram illustrating an example wireless communication method 250, according to various arrangements. Method 250 can be performed by a BS, and begins at 260 where a BS configures at least one Sounding Reference Signal (SRS) resource set for the UE. Each SRS resource set includes at least one SRS resource. At 270, the BS receives, from the UE, an uplink transmission based on the at least one SRS resource set.

In some embodiments, the method 250 further includes receiving, from the UE, at least one first capability set or at least one second capability set. The first capability set includes a set of values for a set of features, or a first index to indicate the set of values for the set of features. The second capability set includes a set of values for a feature, or a second index to indicate the set of values for the feature. In some of these embodiments, the first index indicates the set of values for the set of features from at least one predefined set of values for the set of features, and the second index indicates the set of values for the feature from at least one predefined set of values for the feature. In other of these embodiments, the first capability set corresponds to a panel-related information, and at least one of values in the set of values for a feature in the second capability set corresponds to a panel-related information.

In some embodiments, the feature comprises one of a) a number of ports, b) a number of antenna ports, c) a number of layers, d) a number of beam resources, e) a number of beam resources at a time, f)) a activation delay, or g) a selection delay. The set of features comprises at least one of a) a number of ports, b) a number of antenna ports, c) a number of layers, d) a number of beam resources, e) a number of beam resources at a time, f) a activation delay, or g) a selection delay.

In some embodiments, the method 250 further includes indicating, to the UE, a) a first relationship between the SRS resource set and panel-related information; or b) a second relationship between a SRS resource and panel-related information. In other embodiments, the method 250 further includes configuring a) a first relationship between the SRS resource set and panel-related information based on an RS associated with the SRS resource set; or b) a second relationship between the SRS resource and panel-related information based on a spatial relation of the SRS resource. In any of the above embodiments, the panel-related information comprises at least one of: a) a panel; b) a panel group; c) an antenna array or sub-array; d) an antenna group; e) a SRS resource set or subset; f) a RS resource set or subset; g) a first capability set; or h) an index of a value in a set of values for a feature in a second capability set. In some of these embodiments, the method 250 further includes receiving, from the UE, a number of the plurality of panels for each panel group.

In some embodiments, the method 250 further includes configuring a power for the UL transmission according to at least one of: a) a maximum number of Sounding Reference Signal (SRS) ports related to a SRS resource set associated with the UL transmission; b) a maximum number of Sounding Reference Signal (SRS) ports supported by one SRS resource in a SRS resource set associated with the UL transmission; or c) a maximum number of SRS ports related to the SRS resource set associated with the UL transmission. In other embodiments, the method 250 further includes configuring a power scaling factor for the UL transmission according to at least one of: a) a maximum number of Sounding Reference Signal (SRS) ports related to a SRS resource set associated with the UL transmission; b) a maximum number of Sounding Reference Signal (SRS) ports supported by one SRS resource in a SRS resource set associated with the UL transmission; or c) a maximum number of SRS ports related to the SRS resource set associated with the UL transmission.

In some embodiments, the method 250 further includes configuring a size of Sounding Reference Signal (SRS) Resource Indicator (SRI) field or Transmit Precoding Matrix Index (TPMI) field of Downlink Control Information (DCI) signaling received by the UE from the network. In some of these embodiments, configuring the size of the SRI or TPMI field includes determining an integer N for a number of parts in the SRI field or TPMI field. In some of these embodiments, N is configured according to at least one of: a) a predefined integer or a configured integer; b) a maximum number of Transmission and Reception Points (TRPs) serving the wireless communication device; c) a number of active panels in the wireless communication device; d) a number of SRS resource sets with usage of codebook, or non-codebook; or e) a number of SRS resource sets related to active panels. In other of these embodiments, configuring the size of the SRI or TPMI field includes configuring the size for each part of the field according to at least one of: a) reported values of number of ports; b) reported values of number of ports related to active panel; c) number of ports of SRS resources in SRS resource sets; or d) number of ports of SRS resources in SRS resource sets related to active panel.

In some of these embodiments, configuring the size of the SRI field or TPMI field includes configuring that all parts of each field have the same number of bits. In other of these embodiments, configuring the size of the SRI field or TPMI field includes configuring a number of bits for each part of the fields according to at least one of: a) a largest value among all reported values of a maximum number of ports; b) a largest value among the reported values of a maximum number of ports related to active panels; c) a largest value among the number of ports of SRS resources in SRS resource sets with usage of codebook or non-codebook; or d) a largest value among the number of ports of SRS resources in SRS resource sets related to active panel. In further of these embodiments, configuring the size of the SRI or TPMI field includes configuring the number of bits for the N parts of each field according to at least one of: a) a largest N values among all reported values of maximum number of ports; b) a largest N values among the reported values of maximum number of ports related to active panels; c) a largest N values among the number of ports of SRS resources in SRS resource sets with usage of codebook or non-codebook; or d) a largest N values among the number of ports of SRS resources in SRS resource sets related to active panel.

Figure 3A:
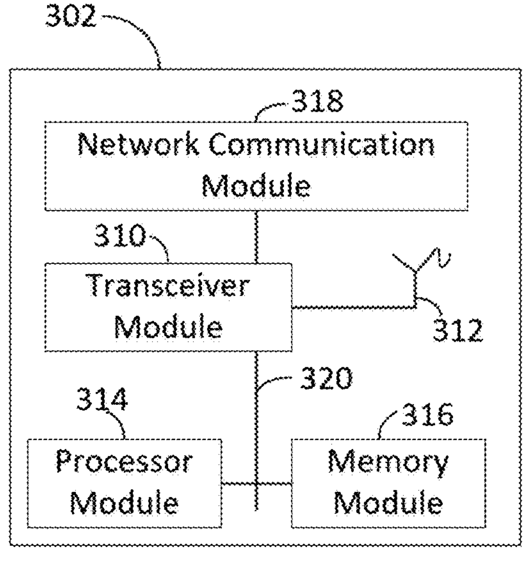
FIG. 3A illustrates a block diagram of an example base station, according to various embodiments.
Figure 3B:
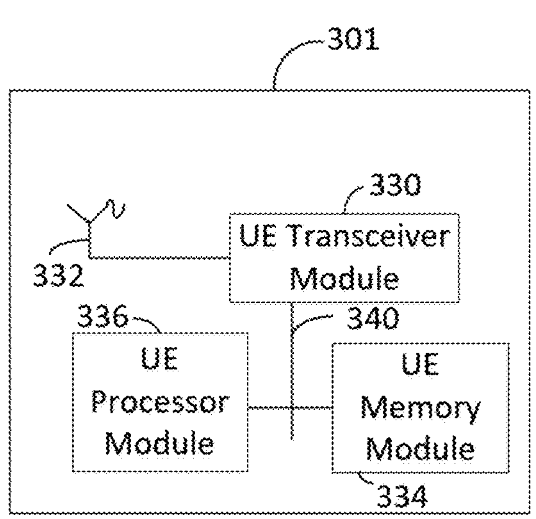
FIG. 3B illustrates a block diagram of an example user equipment, according to various embodiments.

FIG. 3A illustrates a block diagram of an example BS 302, in accordance with some embodiments of the present disclosure. FIG. 3B illustrates a block diagram of an example UE 301, in accordance with some embodiments of the present disclosure. The UE 301 may be a UE (e.g., a wireless communication device, a terminal, a mobile device, a mobile user, and so on) which is an example implementation of the UEs described herein.

The BS 302 and the UE 301 can include components and elements configured to support known or conventional operating features that need not be described in detail herein. In one illustrative embodiment, the BS 302 and the UE 301 can be used to communicate (e.g., transmit and receive) data symbols in a wireless communication environment, as described above. For instance, the BS 302 can be a server, a node, or any suitable computing device used to implement various network functions.

The BS 302 includes a transceiver module 310, an antenna 312, a processor module 314, a memory module 316, and a network communication module 318. The module 310, 312, 314, 316, and 318 are operatively coupled to and interconnected with one another via a data communication bus 320. The UE 301 includes a device transceiver module 330, a device antenna 332, a device memory module 334, and a device processor module 336. The modules 330, 332, 334, and 336 are operatively coupled to and interconnected with one another via a data communication bus 340. The BS 302 communicates with the UE 301 or another device via a communication channel, which can be any wireless channel or other medium suitable for transmission of data as described herein.

As would be understood by persons of ordinary skill in the art, the BS 302 and the UE 301 can further include any number of modules other than the modules shown in FIGS. 3A and 3B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the device transceiver 330 includes a radio frequency (RF) transmitter and a RF receiver each including circuitry that is coupled to the antenna 332. A duplex switch (not shown) may alternatively couple the RF transmitter or receiver to the antenna in time duplex fashion. Similarly, in accordance with some embodiments, the transceiver 310 includes an RF transmitter and a RF receiver each having circuitry that is coupled to the antenna 312 or the antenna of another BS. A duplex switch may alternatively couple the RF transmitter or receiver to the antenna 312 in time duplex fashion. The operations of the two-transceiver modules 310 and 330 can be coordinated in time such that the receiver circuitry is coupled to the antenna 332 for reception of transmissions over a wireless transmission link at the same time that the transmitter is coupled to the antenna 312. In some embodiments, there is close time synchronization with a minimal guard time between changes in duplex direction.

The device transceiver 330 and the transceiver 310 are configured to communicate via the wireless data communication link, and cooperate with a suitably configured RF antenna arrangement 312/332 that can support a particular wireless communication protocol and modulation scheme. In some illustrative embodiments, the device transceiver 330 and the transceiver 310 are configured to support industry standards such as the Long Term Evolution (LTE) and emerging 5G standards, and the like. It is understood, however, that the present disclosure is not necessarily limited in application to a particular standard and associated protocols. Rather, the device transceiver 330 and the LMF transceiver 310 may be configured to support alternate, or additional, wireless data communication protocols, including future standards or variations thereof.

The transceiver 310 and the transceiver of another device (such as but not limited to, the transceiver 310) are configured to communicate via a wireless data communication link, and cooperate with a suitably configured RF antenna arrangement that can support a particular wireless communication protocol and modulation scheme. In some illustrative embodiments, the transceiver 310 and the transceiver of another BS are configured to support industry standards such as the LTE and emerging 5G standards, and the like. It is understood, however, that the present disclosure is not necessarily limited in application to a particular standard and associated protocols. Rather, the transceiver 310 and the transceiver of another device may be configured to support alternate, or additional, wireless data communication protocols, including future standards or variations thereof.

In accordance with various embodiments, the BS 302 may be a BS such as but not limited to, an eNB, a serving eNB, a target eNB, a femto station, or a pico station, for example. The UE 301 can be an RN, a DeNB, or a gNB. In some embodiments, the UE 301 may be a UE embodied in various types of user devices such as a mobile phone, a smart phone, a personal digital assistant (PDA), tablet, laptop computer, wearable computing device, etc. The processor modules 314 and 336 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 314 and 336, respectively, or in any practical combination thereof. The memory modules 316 and 334 may be realized as RAM memory, flash memory, ROM memory, EPROM memory, EEPROM memory, registers, a hard disk, a removable disk, a CD-ROM, or any other form of storage medium known in the art. In this regard, memory modules 316 and 334 may be coupled to the processor modules 314 and 336, respectively, such that the processors modules 314 and 336 can read information from, and write information to, memory modules 316 and 334, respectively. The memory modules 316 and 334 may also be integrated into their respective processor modules 314 and 336. In some embodiments, the memory modules 316 and 334 may each include a cache memory for storing temporary variables or other intermediate information during execution of instructions to be executed by processor modules 314 and 336, respectively. Memory modules 316 and 334 may also each include non-volatile memory for storing instructions to be executed by the processor modules 314 and 336, respectively.

The network communication module 318 generally represents the hardware, software, firmware, processing logic, and/or other components of the BS 302 that enable bi-directional communication between the transceiver 310 and other network components and communication nodes in communication with the BS 302. For example, the network communication module 318 may be configured to support internet or WiMAX traffic. In a deployment, without limitation, the network communication module 318 provides an 502.3 Ethernet interface such that the transceiver 310 can communicate with a conventional Ethernet based computer network. In this manner, the network communication module 318 may include a physical interface for connection to the computer network (e.g., Mobile Switching Center (MSC)). In some embodiments, the network communication module 318 includes a fiber transport connection configured to connect the BS 302 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:

reporting, by a wireless communication device to the network, capabilities of different panels of the wireless communication device;

determining, by the wireless communication device, at least one Sounding Reference Signal (SRS) resource set configured by a network based at least on the capabilities of the different panels, each SRS resource set comprises at least one SRS resource;

transmitting, by the wireless communication device to the network, an uplink transmission based on the at least one SRS resource set.

2. The method of claim 1, wherein the capabilities of different panels of the wireless communication device comprise at least one first capability set or at least one second capability set;

wherein each of the at least one first capability set comprises a set of values for a set of features, or a first index to indicate the set of values for the set of features; and each of the at least one second capability set comprises a set of values for a feature, or a second index to indicate the set of values for the feature.

3. The method of claim 2, wherein the first index indicates the set of values for the set of features from at least one predefined set of values for the set of features, and the second index indicates the set of values for the feature from at least one predefined set of values for the feature.

4. The method of claim 2, wherein the feature comprises one of a number of ports, a number of antenna ports, a number of layers, a number of beam resources, a number of beam resources at a time, a activation delay, or a selection delay, and the set of features comprises at least one of a number of ports, a number of antenna ports, a number of layers, a number of beam resources, a number of beam resources at a time, a activation delay, or a selection delay.

5. The method of claim 2, wherein each of the at least one first capability set corresponds to a panel-related information; and at least one of values in the set of values for a feature in a second capability set corresponds to a panel-related information.

6. The method of claim 1, the method further comprising receiving, by the wireless communication device from the network, an indication indicating a first relationship between the SRS resource set and a panel-related information or a second relationship between a SRS resource and a panel-related information.

7. The method of claim 1, the method further comprising determining, by the wireless communication device, a first relationship between the SRS resource set and a panel-related information based on an RS associated with the SRS resource set, or a second relationship between the SRS resource and a panel-related information based on a spatial relation of the SRS resource.

8. The method of claim 5, wherein the panel-related information comprises one of:

a panel;

a panel group comprising a plurality of panels;

an antenna array or sub-array, an antenna group, a SRS resource set or subset;

a RS resource set or subset;

a first capability set; or an index of a value in a set of values for a feature in a second capability set.

9. The method of claim 8, the method further comprising reporting, by the wireless communication device to the network, a number of the plurality of panels for each panel group.

10. The method of claim 1, further comprising determining, by the wireless communication device, a power for the uplink transmission according to:

a maximum number of SRS ports related to a SRS resource set associated with the uplink transmission;

a maximum number of SRS ports supported by one SRS resource in a SRS resource set associated with the uplink transmission; or a maximum number of SRS ports related to the SRS resource set associated with the uplink transmission.

11. The method of claim 1, further comprising determining, by the wireless communication device, a power scaling factor for the uplink transmission according to one of:

a maximum number of SRS ports related to a SRS resource set associated with the uplink transmission;

a maximum number of SRS ports supported by one SRS resource in a SRS resource set associated with the uplink transmission; or a maximum number of SRS ports related to the SRS resource set associated with the uplink transmission.

12. The method of claim 1, further comprising determining, by the wireless communication device, a size of SRS Resource Indicator (SRI) field or Transmit Precoding Matrix Index (TPMI) field of Downlink Control Information (DCI) signaling received by the wireless communication device from the network.

13. The method of claim 12, wherein determining the size of the SRI field or TPMI field comprises determining N for a number of parts in the SRI field or TPMI field, wherein Nis an integer.

14. The method of claim 13, wherein N is determined according to at least one of:

a predefined integer or a configured integer;

a maximum number of Transmission and Reception Points (TRPs) serving the wireless communication device;

a number of active panels in the wireless communication device;

a number of SRS resource sets with usage of codebook, or non codebook; or a number of SRS resource sets related to active panels.

15. The method of claim 13, wherein determining the size of the SRI field or TPMI field comprises determining the size of the SRI field or TPMI field for each part of the SRI field or TPMI field according to at least one of:

reported values of number of ports;

reported values of number of ports related to active panel;

number of ports of SRS resources in SRS resource sets; or number of ports of SRS resources in SRS resource sets related to active panel.

16. The method of claim 13, wherein determining the size of the SRI field or TPMI field comprises that all parts of the SRI field or TPMI field have a same number of bits; or wherein determining the size of the SRI field or TPMI field comprises that the number of bits for each part of the SRI field or TPMI field is determined according to at least one of:

a largest value among all reported values of a maximum number of ports;

a largest value among the reported values of a maximum number of ports related to active panels;

a largest value among the number of ports of SRS resources in SRS resource sets with usage of codebook or non codebook; or a largest value among the number of ports of SRS resources in SRS resource sets related to active panel.

17. The method of claim 13, wherein determining the size of the SRI or TPMI field comprises that the numbers of bits for the N parts of the SRI or TPMI field are determined according to at least one of:

a largest N values among all reported values of a maximum number of ports;

a largest N values among the reported values of a maximum number of ports related to active panels;

a largest N values among the number of ports of SRS resources in SRS resource sets with usage of codebook or non codebook; or a largest N values among the number of ports of SRS resources in SRS resource sets related to active panel.

18. A wireless communication device, comprising:

at least one processor configured to:

report, via a transmitter to the network, capabilities of different panels of the wireless communication device;

determine at least one Sounding Reference Signal (SRS) resource set configured by a network based on the capabilities of the different panels, each SRS resource set comprises at least one SRS resource;

transmit, via the transmitter to the network, an uplink transmission based on the at least one SRS resource set.

19. A network node, comprising:

at least one processor configured to:

receive from a wireless communication device capabilities of different panels of the wireless communication device;

configure at least one Sounding Reference Signal (SRS) resource set for the wireless communication device based on the capabilities of the different panels, each SRS resource set comprises at least one SRS resource; and receive, via a receiver from the wireless communication device, an uplink transmission based on the at least one SRS resource set.

20. A wireless communication method, comprising:

receiving, by a network from a wireless communication device, capabilities of different panels of the wireless communication device;

configuring, by the network, at least one Sounding Reference Signal (SRS) resource set for the wireless communication device based on the capabilities of the different panels, each SRS resource set comprises at least one SRS resource; and receiving, by the network from the wireless communication device, an uplink transmission based on the at least one SRS resource set.

* * * * *